United States Patent [19]

Bogan

[11] 4,141,865

[45] Feb. 27, 1979

[54] CATALYSTS FOR REACTION OF CARBOXYLIC ACIDS WITH POLYEPOXIDES

[75] Inventor: Gary W. Bogan, Lake Jackson, Tex.

[73] Assignee: The Dow Chemical Company, Midland, Mich.

[21] Appl. No.: 839,970

[22] Filed: Oct. 6, 1977

[51] Int. Cl.$^2$ ............................................. C08L 63/00
[52] U.S. Cl. ............................. 260/18 EP; 260/836; 260/837 R
[58] Field of Search ................... 260/836, 837, 18 EP

[56] References Cited

U.S. PATENT DOCUMENTS

| | | | |
|---|---|---|---|
| 3,256,226 | 6/1966 | Fekete | 260/836 |
| 3,466,259 | 9/1969 | Jernigan | 260/836 |
| 3,564,074 | 2/1971 | Swisher | 260/836 |
| 3,634,542 | 1/1972 | Dowd | 260/836 |
| 3,720,592 | 3/1973 | Mani | 260/836 |
| 3,810,825 | 3/1974 | Mani | 260/836 |
| 3,810,826 | 3/1974 | Mani | 260/836 |
| 3,933,935 | 1/1976 | Zachariades | 260/836 |

FOREIGN PATENT DOCUMENTS 871767  6/1961  United Kingdom.

*Primary Examiner*—Paul Lieberman

[57] ABSTRACT

Improved products and reaction conditions for preparing the same result from the reaction at elevated temperatures using a combination of a trisubstituted phosphine and a soluble chromium compound as catalyst for reacting a polyepoxide with carboxylic acids composed essentially of a dicarboxylic acid, an ethylenically unsaturated monocarboxylic acid and, optionally, a saturated monocarboxylic acid.

10 Claims, No Drawings

CATALYSTS FOR REACTION OF CARBOXYLIC ACIDS WITH POLYEPOXIDES

BACKGROUND OF THE INVENTION

The present invention is concerned with the catalytic inducement of the reaction of the oxirane groups of a polyepoxide with carboxylic acids. Generically the invention is directed to the preparation of a terminally unsaturated polyester from a polyepoxide, a dicarboxylic acid and an unsaturated monocarboxylic acid. Such polyesters, which are known, as, for example, in U.S. Pat. No. 2,256,226 have a spectrum of properties making them valuable in a wide variety of end uses. When a small amount of relatively long chain saturated monocarboxylic acid is used to replace a part of the unsaturated acid, the products are especially well adapted for use in radiation curable printing inks and coatings as shown in the copending application of Bogan and Hickner, U.S. Ser. No. 644,693 filed Dec. 29, 1975.

The general reaction of an oxirane and a carboxyl group has been known for a long time as exemplified by U.S. Pat. No. 2,929,835 wherein the reaction was catalyzed by inorganic bases and by amino compounds. More specifically, the reaction of an ethylenically unsaturated monocarboxylic acid with a diepoxide was taught in U.S. Pat. No. 3,066,112 wherein tertiary amines, such as dimethyl-para-toluidine; and para-toluene sulfinic acid were used as catalysts.

The use of compounds containing an ionizable atom of iron or chromium as a catalyst for the reaction was taught in British Pat. No. 871,767.

Trivalent chromium salts or amines as catalysts for preparing flexible vinyl ester resins is noted in U.S. Pat. No. 3,933,935.

Phosphonium, sulfonium or ammonium salts of inorganic acids are employed as catalysts for the reaction in U.S. Pat. No. 3,377,406.

All of the prior art catalyst systems suffer from one or more disadvantages when applied to the tricomponent monomer mix of this invention.

SUMMARY OF THE INVENTION

The process improvement of this invention is the use at elevated temperatures of a combination of a triphenyl phosphine and a soluble chromium compound as cocatalysts in the reaction of a polyepoxide, a dicarboxylic acid and an ethylenically unsaturated monocarboxylic acid to produce a terminally unsaturated polyester. The cocatalysts produce beneficial effects in the stated reaction that cannot be achieved with either of the components alone or with any other known esterification catalyst nor any combination thereof.

The reactants are known materials, which, when reacted in certain ratios, result in valuable products.

As a starting material in the present process, the dicarboxylic acid has the general formula $R(COOH)_2$ wherein R is an organic radical which may consist of:

A carbon-to-carbon bond (e.g., oxalic acid);

An aliphatic radical (e.g., adipic acid);

An ethylenically unsaturated aliphatic radical (e.g., maleic acid);

An aryl radical (e.g., phthalic acid); and Halogenated aryl radicals (e.g., tetrachlorophthalic acid).

Where the dicarboxylic acid of this invention also includes ethylenic unsaturation (e.g., maleic acid, fumaric acid), the resulting polyester will contain additional ethylenically unsaturated sites for subsequent cross-linking and copolymerization.

It is possible to utilize as the dicarboxylic acid for this invention a double ester formed from two moles of a dicarboxylic acid anhydride and one mole of a dihydric alcohol. For example, the double ester of maleic acid anhydride and ethylene glycol:

It will be observed that the double ester possesses two terminal carboxylic acid groups which, for the present purposes, qualify the material as a dicarboxylic acid.

Suitable acids include phthalic acid, isophthalic acid, terephthalic acid, maleic acid, fumaric acid, succinic acid, adipic acid, and their halogenated derivatives such as tetrachlorophthalic acid, tetrabromophthalic acid and the like.

Another useful class of dicarboxylic acids includes those of relatively high molecular weight wherein, for example, the carboxyl groups are separated by from about 20 to about 36 carbon atoms. Typical of such diacids include the various dimerized acids such as that sold commercially as a $C_{36}$ diacid as Empol 1022. Such dimerized fatty acids typically contain varying amounts of trimerized or 54 carbon acid. Thus, for example, Empol 1022 contains 75 percent dimer acid, 22 percent trimer acid, and 3 percent unreacted fatty acid. The diacid should be free of groups other than carboxyl that are reactive with an oxirane ring.

The composition includes an $\alpha,\beta$-ethylenically unsaturated monocarboxylic acid. Suitable acids include acrylic, methacrylic, crotonic, cinnamic and the like.

As another unsaturated carboxylic acid, it is possible to use a half ester formed by reaction of one mole of a hydroxyalkyl acrylate with a cyclic anhydride. Suitable hydroxyalkyl acrylates include the mono acrylic esters of polyethylene or polypropylene glycols having molecular weights up to about 400 and preferably up to about 200. Representative cyclic anhydrides include maleic anhydride, phthalic anhydride, dodecenylsuccinic anhydride, tetrachlorophthalic anhydride and the like.

A saturated monocarboxylic acid may also be used in partial replacement of the unsaturated monoacid. Advantageously such saturated acids will contain from about 9 to about 18 carbon atoms. Typical of those acids are pelargonic acid, undecylic acid, lauric acid, myristic acid, palmitic acid and stearic acid. Such acids are frequently present in mixtures of the acids and those mixtures may also be employed.

Any of the known polyepoxides can be employed in the preparation of the resins of this invention. Useful polyepoxides are glycidyl polyethers of both polyhydric alcohols and polyhydric phenols, epoxy novolacs or mixtures thereof.

Within the scope of this invention, a number of polyepoxide modifications can be readily made. It is possible to increase the molecular weight of the polyepoxide by polyfunctional reactants which react with the epoxide group and serve to link two or more polyepoxide molecules. A dicarboxylic acid, for example, can be reacted with a diepoxide, such as the diglycidyl ether of a bisphenol, in such a manner so as to join two or more diepoxide molecules and still retain terminal epoxide groups.

The novolac resins lead to a separate, well recognized class of epoxy novolac resins. Other modifications are well known to those skilled in the art.

Further, it is well recognized that flame retardancy properties can be obtained by the introduction of phosphorus and halogen into the epoxy resin itself or by the selection of fillers, extenders, curing agents and the like which contribute to the flame retardant properties. For example, high levels of bromine can be introduced into the resin by the use of tetrabromo bisphenol A.

While the invention is applicable to polyepoxides generally, a most advantageous class of polyepoxides are those glycidyl polyethers of polyhydric alcohols or polyhydric phenols having weights per epoxide group of 150 to 2000 (i.e., epoxy equivalent weight). These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group, i.e., a 1,2-epoxy equivalency greater than one.

A preferred class of polyepoxides are those derived from a methylene bisphenol or a 2,2'-isopropylidene bisphenol.

The above reactants are incorporated in the compositions to provide essentially a stoichiometric equivalency of carboxyl function with the oxirane groups present. By that is meant that there are from about 0.8 to about 1.15 equivalents of carboxylic acid ingredients for each equivalent of polyepoxide and preferably 0.9 to about 1.05 equivalents of carboxylic acid.

Within that general ratio the acids may be used in a wide range of proportions. For example, an advantageous class of resins for laminating, encapsulating, molding and similar applications results from the use of the proportions of one mole of diepoxy compound, 1.0 to 0.2 mole of ethylenically unsaturated monocarboxylic acid and 0.5 to 0.9 mole dicarboxylic acid. Also within the general ratio, a class of resins for making radiation curable printing inks and coatings results from the proportions wherein the diacid is in the range of 0.1 to 0.3 equivalent, the unsaturated monoacid from 0.5 to 0.9 equivalent and a saturated monocarboxylic acid as earlier defined in the range from 0 to 0.3 equivalent.

Because of the presence of reactive ethylenically unsaturated groups in the reaction mixture, it is essential to maintain an inventory of a suitable vinyl-polymerization inhibitor in the reaction mixture and also in the product composition. Any of the hydroquinones and quinones have been found to be suitable for this purpose. It is generally preferred to employ the hydroquinones such as hydroquinone and the methyl ether of hydroquinone. Other successful inhibitors include p-quinone, 2,5-dimethyl-p-benzoquinone, 1,4-naphthaquinone, anthraquinone, chloranil.

The cocatalysts, whereby the benefits of the invention are attained, include a triphenyl phosphine and a chromium salt.

Preferred phosphines are the organic phosphines, i.e., compounds of the formula:

$P(R)_3$ wherein at least one R is an organic radical and the other R's are hydrogen or organic radicals and preferably hydrocarbon radicals or substituted hydrocarbon radicals which may contain no more than 25 carbon atoms. Examples of the phosphines include triphenyl phosphine, tributyl phosphine, trilauryl phosphine, tricyclohexyl phosphine, trihexyl phosphine, triallyl phosphine, tridodecyl phosphine, trieicosadecyl phosphine, trichlorobutyl phosphine, triethoxybutyl phosphine, trihexenyl phosphine, trixylyl phosphine, trinaphthyl phosphine, trichlorohexenyl phosphine, tri(3,4-diethyloctyl)phosphine, trioctadecyl phosphine, dioctyldecyl phosphine, dichlorohexyl phosphine, dibutyl allyl phosphine and the like, and mixtures thereof.

Particularly preferred phosphines to be employed include the trihydrocarbyl, dihydrocarbyl and monohydrocarbyl phosphines wherein the hydrocarbyl radicals (hydrocarbon radicals) contain from 1 to 18 carbon atoms, and more particularly those wherein the hydrocarbon radicals are alkyl, cycloalkyl, alkenyl, cycloalkenyl, aryl, alkaryl, arylalkyl, and the like radicals. Coming under special consideration are the phosphines containing at least one and preferably three aromatic radicals.

Suitable chromium salts include those that are soluble in the polyepoxide or the acidic reactants and contain an ionizable atom of chromium. Preferred catalysts are the trivalent chromium salts, such as chromium acetate and chromium chloride.

Each of the components of the cocatalyst is employed in an amount of from 0.2 to 0.5 millimole per equivalent of total carboxyl in the reactant mix. Preferably each is used in an amount of 0.3 to 0.4 millimole. Variations in the level of either or both of the components may adversely affect the reaction rate or the thixotropy index of the resultant product.

The reaction is advantageously carried out at an elevated temperature of from about 80 to 120° C. Below 80° C. the reaction rate is generally too slow to achieve significant benefits over prior catalyst systems. Above 120° C. the possibility of undesirable side reactions exists and the possibility of a difficultly controllable exotherm is presented.

The reaction is run at atmospheric or slightly higher pressure.

The ingredients, including the reactants, cocatalyst, inhibitor and any other additive, may be mixed in any order. Preferably the reactants and inhibitor are brought to the desired reaction temperature and the cocatalyst then added.

By using the stated cocatalyst with the noted reaction conditions, it is possible to achieve about quantitative yields of the desired products having a major portion of the molecules with unsaturated terminal groups. The products are liquid or solid and are useful in a wide variety of applications including laminating, encapsulating and molding end uses with or without reinforcing elements and fillers. The products including a saturated monocarboxylic acid are especially well adapted for use in formulating radiation curable printing inks and coatings. In that instance it is a practical necessity to include a known photosensitizer as, for example, benzophenone, Michler's ketone and other such materials that are well known in the art.

The products may be blended with other conventional additives. Thus, colorants may be added for their intended effect, waxes to increase resistance to blocking, phenolic resins to improve the surface properties of articles fabricated therefrom as well as thermoplastic resins as low profile additives.

The concept of the invention will be illustrated by the following non-limiting examples wherein all parts and percentages are by weight.

EXAMPLE 1

The example illustrates a comparison of various catalysts in the preparation of a product from the ratio of 1 equivalent of the diglycidyl ether of bisphenol A; 0.15 equivalent of a 36 carbon dimer acid (Empol 1022); 0.05 equivalent of a 9 carbon saturated monoacid (Emfac 1202) and 0.8 equivalent of acrylic acid. Specifically the amounts of reactants were 500 grams diglycidyl ether; 115 grams dimer acid; 22 grams saturated monoacid; 157 grams acrylic acid and 0.27 gram hydroquinone.

The reactants were charged to a resin kettle, the temperature raised to 80° C. and the catalyst added. The temperature was gradually increased to 115° C. where it was maintained until addition was substantially complete as indicated by the percent acid and percent epoxide of the product being each below 0.5.

Various property evaluations were made on the products with the results shown in the following table. In the table, viscosity is the kinematic viscosity of the resin in centistokes at 60° C.; stability is the number of days at 80° C. without gelation; and Thixotropy Index is measured on a composition of 33 percent resin, 33 percent titanium dioxide and 33 percent 2-acetoxypropyl acrylate and is the relationship:

$$\eta_{60°}(5 \text{ rpm})/\eta_{60°}(50 \text{ rpm})$$

using a Brookfield Viscometer.

TABLE

| Catalyst | Reaction Time (hrs) | Viscosity | Stability | Thixotropy Index |
|---|---|---|---|---|
| This invention | | | | |
| TPP/Cr Acetate | | | | |
| (0.36/0.25 mmole) | 6 | 3556 | >14 | 0.97 |
| For Comparison | | | | |
| Cr Acetate (0.61 mmole) | 5 | 2976 | — | 3.33 |
| TPP (0.61 mmole) | >>5* | — | — | — |
| DMP-30 (0.2% of epoxide) | 13 | 4736 | <1 | — |
| TPP/DMP-30 | 8 | 4273 | <1 | — |
| (0.36 mmole/0.2%) | | | | |

In the table TPP is triphenyl phosphine and DMP-30 is tris(dimethyl aminomethyl)phenol
*Reaction was 50 percent complete in 5 hours.

As shown in the above table, triphenyl phosphine was impractically slow when used alone; chromium acetate by itself resulted in a product with a high thixotropic index indicating poor pigment wetting ability; DMP-30 by itself or in combination with triphenyl phosphine gave products of higher viscosity and very poor shelf stability.

It was only when the cocatalyst of this invention was used that the reaction proceeded controllably rapidly and the product had excellent shelf stability and a thixotropy index suggesting good pigment wetting ability.

It was also attempted to use tetramethyl ammonium chloride and 4-methylmorpholine separately as catalysts for the reaction of this example. In each instance the reaction mix gelled prematurely.

What is claimed is:

1. In the process for preparing a curable resin composition by the catalytic induced simultaneous reaction of a polyglycidyl ether and carboxylic acids consisting essentially of at least one dicarboxylic acid and at least one ethylenically unsaturated monocarboxylic acid, all of stated ingredients being in stoichiometric equivalency of epoxy to carboxyl groups, the improvement wherein said reaction mixture is heated to an elevated temperature in contact with a catalyst composed of about 0.2 to 0.5 mole of triphenyl phosphine and about 0.2 to 0.5 mole chromium triacetate per equivalent of polyglycidyl ether until reaction is substantially complete.

2. The process of claim 1 wherein said reaction mixture is heated to a temperature of from 80 to 120° C.

3. The process of claim 1 wherein said reaction mixture is composed of 0.5 to 0.9 mole dicarboxylic acid and 1.0 to 0.2 mole ethylenically unsaturated monocarboxylic acid for each mole of a diepoxide.

4. The process of claim 3 wherein said diepoxide is the diglycidyl ether of bisphenol A.

5. The process of claim 3 wherein said dicarboxylic acid is a dimer acid containing from 20 to 36 carbon atoms and said monocarboxylic acid is acrylic acid.

6. The process of claim 1 wherein said reaction mixture is composed of from 0.1 to 0.2 equivalent of a saturated monocarboxylic acid, from 0.2 to 0.3 equivalent of a dicarboxylic acid, about 1.6 equivalents of an ethylenically unsaturated monocarboxylic acid and 2.0 equivalents of a diepoxide.

7. The process of claim 6 wherein said saturated monocarboxylic acid is pelargonic acid.

8. The process of claim 6 wherein said diepoxide is the diglycidyl ether of bisphenol A.

9. The process of claim 6 wherein said dicarboxylic acid is a dimer acid containing from 20 to 36 carbon atoms and said ethylenically unsaturated monocarboxylic acid is acrylic acid.

10. The process of claim 1 wherein said polyepoxide is an epoxy novolac.

* * * * *